United States Patent [19]

Auracher et al.

[11] Patent Number: 4,545,642
[45] Date of Patent: Oct. 8, 1985

[54] PRISM COUPLER DEVICE FOR AN OPTICAL WAVEGUIDE

[75] Inventors: Franz Auracher, Buchenhain bei Baierbrunn; Rudolf Keil, Munich, both of Fed. Rep. of Germany

[73] Assignee: Siemens Aktiengesellschaft, Berlin & Munich, Fed. Rep. of Germany

[21] Appl. No.: 352,326

[22] Filed: Feb. 25, 1982

[30] Foreign Application Priority Data

Mar. 31, 1981 [DE] Fed. Rep. of Germany ........ 3112939

[51] Int. Cl.$^4$ ................................................. G02B 5/14
[52] U.S. Cl. ................................ 350/96.19; 350/96.15
[58] Field of Search ............................ 350/96.19, 96.15

[56] References Cited

U.S. PATENT DOCUMENTS 4,059,338 11/1977 Hartelius, Jr. ................... 350/96.19
4,152,045 5/1979 Hammer ........................... 350/96.19

Primary Examiner—William L. Sikes
Assistant Examiner—Robert E. Wise
Attorney, Agent, or Firm—Hill, Van Santen, Steadman & Simpson

[57] ABSTRACT

A prism coupler for coupling light into and out of an optical waveguide and characterized by the temperature dependency being eliminated. This is accomplished by a skillful selection of the prism angle and the prism material of a single prism or by combining two prisms of different materials whose indices of refraction and prism angles are selected to compensate for the effects of temperature on both the prism and the waveguide. Preferably, the waveguide is doped in a substrate of $LiNbO_3$ and the prism utilizes a compound prism having a first prism consisting of $LiNbO_3$ and a second prism of polystyrene.

5 Claims, 4 Drawing Figures

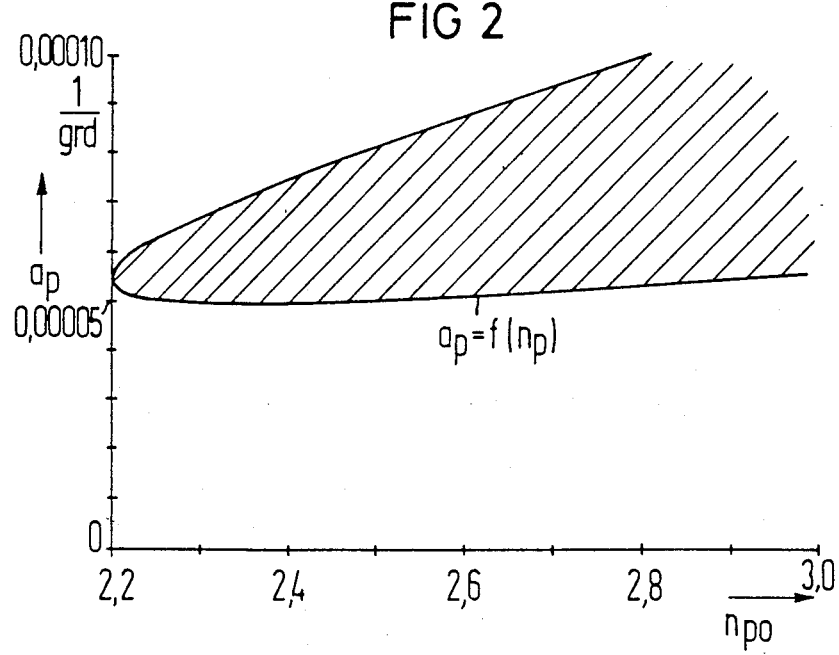
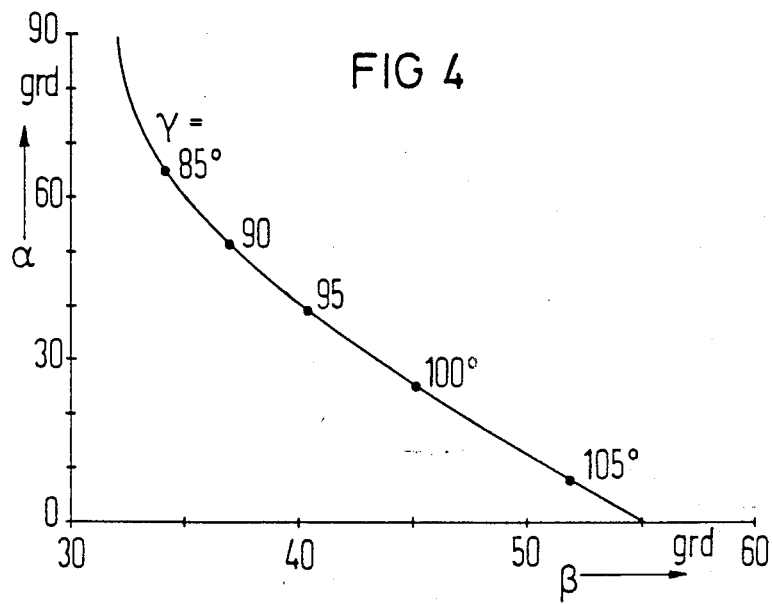

PRISM COUPLER DEVICE FOR AN OPTICAL WAVEGUIDE

BACKGROUND OF THE INVENTION

The present invention is directed to a prism coupler for coupling radiation into and out of an optical waveguide by utilizing a coupler composed of a prism having a base surface with a coupling surface extending from the base surface at a prism angle. The prism is positioned with the base surface in contact with the waveguide and the prism angle and index of refraction of the prism will determine the coupling angle to the normal of the coupling surface for coupling radiation into and out of the waveguide.

In the coupling of light into and out of an optical waveguide by use of a prism, the coupling angle $\alpha$ as a rule is temperature-dependent.

SUMMARY OF THE INVENTION

The present invention is directed to providing a prism coupling device in which the coupling angle can be made temperature-independent.

To accomplish this object, a prism coupler comprising a single prism has the prism angle between a base surface and a coupling surface as well as the index of refraction selected so that the effect of the temperature on the index of refraction of the prism and the effect of temperature on the index of refraction $n_{eff}$ for the waveguide will compensate one another. Preferably, the coupler comprises a first prism of a material having an index of refraction $n_p$, said first prism having a base surface and a coupling surface extending at a prism angle $\gamma'$ to the base surface, and at least one second prism of a different material having an index of refraction $n_v$, a base surface and a coupling surface extending at a prism agnle $\beta$, said first and second prisms being disposed with their base surfaces enaging the waveguide and the coupling surface of the second prism positioned to receive radiation traveling in a direction R forming a coupling angle $\alpha$ with a normal of the coupling surface to pass through the second prism to enter the coupling surface of the first prism and be coupled into the waveguide and to emit radiation traveling in an opposite direction, said angle $\alpha$ being determined by the indices $n_p$, $n_v$ and $n_{eff}$ and by the prism angles $\gamma'$ and $\beta$, said angles $\gamma'$ and $\beta$ and the indices $n_p$ and $n_v$ being selected to compensate for the effective temperature in the index of refraction $n_{eff}$ of the waveguide.

Preferably the planar waveguide is produced in a substrate of $LiNbO_3$ by a doping of the substrate and the first prism is selected from a material from a group consisting of $LiNbO_3$ and rutile, while the second prism is selected from a group of materials consisting of polystyrene, polymethylmethacrylate and polycarbonate. Preferably, the first prism will consist of $LiNbO_3$ and the second prism will consist of polystyrene. The second prism will have an additional coupling surface that extends parallel to the coupling surface of the first prism and the two prisms are arranged with the additional coupling surface of the second prism in surface contact with the coupling surface of the first prism, and the prism angles $\gamma'$ and $\beta$ are calculated from the equation:

$$n_{vo} = \left\{ \left( \sqrt{n_{po} - n_{eff}} \; \frac{\sin \gamma'}{\sin(\gamma' - \beta)} + \frac{\sin \alpha}{\tan(\gamma' - \beta)} - n_{eff0} \frac{\cos \gamma}{\sin(\gamma' - \beta)} \right)^2 + \sin^2 \alpha \right\}^{\frac{1}{2}}$$

and by the relationship or inequation:

$$\left| \sin(\gamma' - \beta) \cdot \sqrt{n^2 - \sin^2 \alpha} - \cos(\gamma' - \beta) \cdot \sin \alpha \right| \leq 2$$

BRIEF DESCRIPTION OF THE DRAWINGS

FIG. 2 is a diagram illustrating a region of suitable values for the refractive index $n_p$ and of the temperature coefficient $a_p$ of a prism for the purpose of coupling light into $LiNbO_3$ waveguide in which the coupling angle $\alpha$ is temperature-independent;

FIG. 4 is the functional relationship between a temperature-independent coupling angle $\alpha$ for a waveguide of $LiNbO_3$ and the coupling angles of the two prisms of the compound prism where the first prism is $LiNbO_3$ and the second prism is polystyrene.

DESCRIPTION OF THE PREFERRED EMBODIMENTS

Figure 1:
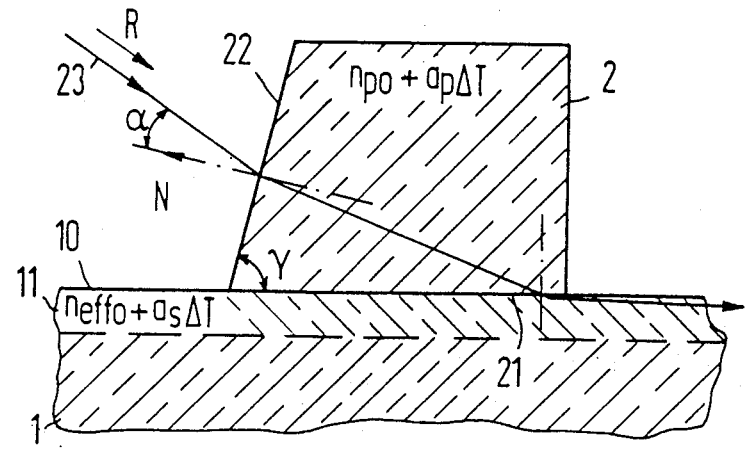
FIG. 1 is a cross-sectional illustration of a prism coupler comprising a single prism disposed on a waveguide.

The principles of the present invention are particularly useful when incorporated in a prism coupler which is illustrated in FIG. 1 and consists of a single prism 2 for coupling llight into a planar waveguide 11 in a substrate 1.

The substrate 1 consists of $LiNbO_3$ and has the surface 10 in which the planar waveguide 11 has been formed by diffusion or otherwise doping of the substrate. The planar waveguide 11 will have an effective refractive index $n_{eff}$.

A single prism 2 of the coupler of FIG. 1 will have a base surface 21 which is received on the surface of the waveguide 11. The prism 2 has a coupling surface 22 which extends at a prism angle $\gamma$ to the base surface 21. Radiation to be coupled into the waveguide 11 is represented by a beam 23 and is supplied to the coupling surface 22 in a direction R which will form a coupling angle $\alpha$ with surface normal N of the coupling surface 22. Also, light being coupled out of the waveguide will radiate or exit through the coupling surface 22 in a direction opposite to the direction R.

Coupling in proceeds only at a specific coupling angle $\alpha$ which is determined by the equation:

$$\alpha = \arcsin \left( n_p \cdot \sin \left( \gamma - \arcsin \frac{n_{eff}}{n_p} \right) \right) \quad (1)$$

In this equation, $n_p$ is the index of refraction of the prism material and this index of refraction must be greater than the effective index of refraction $n_{eff}$ of the light mode being guided in the waveguide 11.

The coupling angle $\alpha$, as a rule, is temperature-dependent because $n_p$ and $n_{eff}$ are temperature-dependent and a change of the value for $n_p$ and $n_{eff}$ from the above equation (1) will occur with a temperature change. In the temperature range of interest which is $-40°$ C. to $+85°$ C. The approximation of this dependency is a linear dependency for the above cited indices of refraction and the following equations are valid:

$$n_p = n_{po} + a_p \cdot \Delta T; \; n_{eff} = n_{effo} + a_s \Delta T; \text{ and } \Delta T = T - T_o \quad (2)$$

In the above equation, $T_o$ signifies a predetermined temperature for example an ambient temperature; $n_{po}$ and $n_{effo}$ are the index of refractions of the prism and the effective index of refraction of the waveguide, respectively, at the temperature $T_o$; $a_p$ is a temperature coefficient wherein $a_p = dn_p/dT$ at a temperature of $T_o$ and $a_s$ is the temperature coefficient for the substrate material of the waveguide and $a_s = dn_{eff}/dT$ at a temperature of $T_o$. In addition, these two coefficients denote the differential quotients of the two refractive index of refractions $n_p$ and $n_{eff}$, respectively, according to a temperature at the specific temperature $T_o$.

The condition for temperature-dependent light input coupling can be ascertained by inserting each of the equations (2) into the equation (1). In neglecting the quadratic temperature elements $T^2$, there will result $$a_p = a_s \left( \frac{n_{effo}}{n_{po}} + \frac{1}{\tan \gamma} \sqrt{1 - \left(\frac{n_{effo}}{n_{po}}\right)^2} \right) \quad (3)$$

wherein the secondary condition $$\left| \sin \gamma \sqrt{n_{po}^2 - n_{effo}^2} - n_{effo} \cos \gamma \right| = |\sin \alpha| \leq 1 \quad (4)$$

still has to be satisfied.

Given preselected values for $n_{effo}$ and $a_s$, the equation (3) and the second condition set forth in the relationship (4) determines a range or possible values for $n_{po}$ and $a_p$ in which the coupling angle $\alpha$ is temperature-independent. This range is limited by a curve $a_p = f(n_p)$ which is determined from the equation (3) and the relationship $$\left| \sin \gamma \sqrt{n_{po}^2 - n_{effo}^2} - n_{effo} \cos \gamma \right| = 1 \quad (4')$$

In FIG. 2, a diagram of the curve $a_p = f(n_p)$ is shown for a specific diffusion waveguide 11 in LiNbO$_3$ substrate which has $n_{effo} = 2.201$; $a_s = 5.45 \times 10^{-5}$ 1/degree at a wavelength of $\lambda_0 = 633$ nm and which assumes that $T_o = 20°$ C. The shaded region in FIG. 2, which is bounded by this curve, is the range of possible values of $n_{po}$ and $a_p$ at which the coupling angle $\alpha$ is temperature-independent.

If, in the case of a preselected waveguide which has a specific $n_{effo}$ and $a_s$ at a given preselected temperature $T_o$, one has freely selected a material for the prism in which, at the preselected temperature $T_o$, the quantities $n_{po}$ and $a_p$ exhibit possible values, then the respective prism angle $\gamma$ can be determined from equation (3) and then the respective coupling angle $\alpha$ can be determined from equation (1). A prism fabricated from such a material and provided with such a prism angle compensates the effective temperature on the index of refraction $n_{eff}$ of the specific waveguide at least in the first approximation.

From FIG. 2, it can be readily learned that for diffusion waveguides in a substrate of LiNbO$_3$, a temperature-independent coupling-in is possible neither with a prism consisting of LiNbO$_3$ which has the values $n_{po} = 2.291$ at $T_o = 20°$ C. and $a_p = 10^{-5}$ 1/degree nor with a rutile prism which has an ordinary index of refraction $n_o = 2.586$ and $dn_o/dT = -3.5 \times 10^{-5}$ 1/degree and an extraordinary index of refraction $n_e = 2.872$ and $dn_e/dT = -8 \times 10^{-5}$ 1/degree which information is taken from *Optical Constants*, Vol. II/8, because for both of tjese materials, the indicated values do not fall into the shaded area of the curve of FIG. 2 and thus are not possible values. These two frequently employed prism materials thus are eliminated in the specific instance and it would be necessary to search for other suitable materials.

Figure 3:
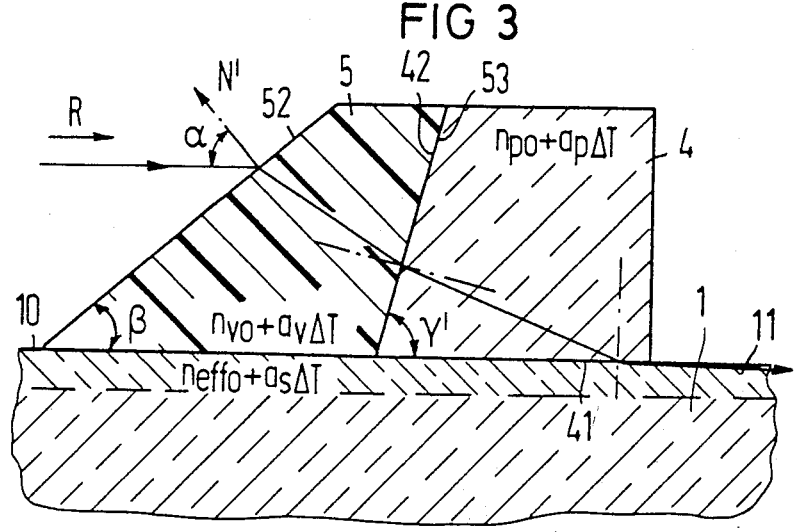
FIG. 3 is a cross-sectional view through a prism coupler consisting of a composite prism of two prisms of different material in accordance with the present invention.

However, one can construct a prism coupler with prism materials which are unsuited for a single prism. Thus, when using a prism of either LiNbO$_3$ or rutile, the coupling angle $\alpha$ can be made temperature-independent. To this end, a prism is employed, which is composed of two or more prisms consisting of different materials. An example of such a compound prisml, which is used as a coupler, is illustrated in FIG. 3. In this case, the coupler utilizes a first prism 4, which is composed of LiNbO$_3$ and coacts with a second or supplementary prism 5 which consists of another material. As illustrated, the first or primary prism 4 has a base surface 41 and a coupling surface 42 that extends at a prism angle $\gamma'$. The prism 4 is placed with the base surface 41 engaging the waveguide 11.

The supplementary or second prism 5 is also placed on the waveguide 11 and has a base surface 51 with a coupling surface 52 which forms a prism angle $\beta$ and faces away from the coupling surface 42 of the first prism 4. The prism 5 has an additional coupling surface 53, which is positioned opposite the coupling surface 42 of the first prism and is preferably at the same complementary angle so that a surface contact therebetween exists.

The supplementary prism 5 exhibits an index of refraction $n_v$, wherein $n_v + n_{vo} = a_v \cdot \Delta T$, wherein $n_{vo}$ signifies the index of refraction at the preselected temperature $T_o$ and $a_v = dn_v/dT$ for a temperature change at $T_o$. For the coupling angle $\alpha$ relative to the surface normal $N'$ of the coupling surface 52 of the supplementary prism 5, the angle $\alpha$ is determined by the following equation:

$$\alpha = \arcsin \left\{ \sin(\gamma' - \beta) \sqrt{n_v^2 - n_p^2 \sin^2\left(\gamma' - \arcsin \frac{n_{eff}}{n_p}\right)} - n_p \cos(\gamma' - \beta) \sin\left(\gamma' - \arcsin \frac{n_{eff}}{n_p}\right) \right\} \quad (5)$$

wherein $n_p$ and $a_p$ relate to the prism 4 of LiNbO$_3$ and $n_{eff}$ and $a_s$ relate to the waveguide 11 and are defined by the equation (2). If one introduces the right side of the above indicated equation for $n_v$ and the right side of the equation (2) into equation (5) and if one again ignores the quadratic elements $T^2$, one then obtains for a temperature-independent coupling angle $\alpha$, the following equation:

$$n_{vo} = \left\{ \left( \sqrt{n_{po} - n_{eff}} \; \frac{\sin \gamma'}{\sin (\gamma' - \beta)} + \frac{\sin \alpha}{\tan (\gamma' - \beta)} - n_{effo} \cdot \frac{\cos \gamma}{\sin (\gamma' - \beta)} \right)^2 + \sin^2 \alpha \right\}^{\frac{1}{2}} \quad (6)$$

and $$a_v = \frac{\sqrt{n_{po}^2 - n_{effo}^2} \cdot \sin \gamma' + \sin \alpha \cos (\gamma' - \beta) - n_{effo} \cdot \cos \gamma'}{n_{vo} \sin^2 (\gamma' - \beta)} \cdot \left( \frac{a_p n_{po} - a_s n_{effo}}{\sqrt{n_{po}^2 - n_{effo}^2}} \sin \gamma' - a_s \cos \gamma' \right) \quad (7)$$

with a secondary condition by the relationship or equation:

$$\left| \sin (\gamma' - \beta) \cdot \sqrt{n_v^2 - \sin^2 \alpha} - \cos (\gamma' - \beta) \sin \alpha \right| \leq n_v \quad (8)$$

For the cited combination, which utilizes a diffusion waveguide formed in an $LiNbO_3$ substrate and utilizing a first prism of $LiNbO_3$ and a second prism of another material, one obtains from the equations (6) and (7) the specific requirements for $n_{vo}$ and $a_v$. However, no optical glass falls in the parameter of $n_{vo}$ in the range of between 1.4 and 1.8 and having an $a_v$ which is approximately in the range of $-10^{-5}$ 1/degree and $10^{-5}$ 1/degree as shown for example by *Optical Catalog* 3050/66, Jenaer Glaswerke Schott.

However, a prism formed of an optical plastic, which has a value for $n_{vo}$ which lies approximately between 1.4 and 1.7 and also a value for $a_v$ which is approximately between $-2 \times 10^{-4}$ 1/degree and $-10^{-4}$ 1/degree are available for example as shown by *Optical Constants*, Vol. II/8. Polystyrene has proven to be a suitable plastic for a supplemental prism 5 for use with the prism 4 of $LiNbO_3$. Given a temperature $T_o = 20°$ C., polystyrene has an index of refraction $n_{vo} = 1.59$ and a coefficient $a_v = -1.66 \times 10^{-4}$ 1/degree as shown by the *Optical Constants*, Vol. II/8.

A diagram is shown in FIG. 4 for the prism combination of the first prism 4 and the second prism 5. This diagram shows the three angles, which are the coupling angle $\alpha$, a prism angle $\beta$ for the second prism 5 of polystyrene and a prism angle $\gamma'$ for a prism 4 composed of $LiNbO_3$ in which the coupling angle $\alpha$ will be temperature-independent.

For a prism combination with a temperature-independent coupling angle $\alpha$ in which the beam direction of the radiation is to be coupled in and out in axial relative to the waveguide 11, the prism 4 of $LiNbO_3$ exhibits a prism angle of $\gamma' = 89.2°$ and the supplemental prism of polystyrene exhibits a prism angle $\beta = 36.4°$. Additional optical plastics which are suitable for the supplemental or second prism are, for example, polymethylmethacrylate sold under the trademark "PLEXIGLASS" and polycarbonate.

Although various minor modifications may be suggested by those versed in the art, it should be understood that we wish to embody within the scope of the patent granted hereon, all such modifications as reasonably and properly come within the scope of our contribution to the art.

We claim:

1. A prism coupler for coupling radiation into and out of an optical waveguide at a selected temperature range $\Delta T$, said waveguide having an index of refraction $n_{eff}$, said coupler comprising a first prism of a material having an index of refraction $n_p$, said first prism having a base surface and a coupling surface extending at a prism angle $\gamma'$ to the base surface, at least one second prism of a material which is different than the material of the first prism and having an index of refraction $n_v$, said second prism having a base surface, a coupling surface extending at a prsim angle $\beta$ and an additional coupling surface, said first and second prisms being disposed with their base surfaces engaging the waveguide with the additional coupling surface being parallel to the coupling surface of the first prism and in surface contact therewith, and the coupling surface of the second prism being positioned to receive radiation in a direction R at a coupling angle $\alpha$ with a normal to the coupling surface of the second prism and with the radiation passing through the second prism to enter the coupling surface of the first prism and to be coupled by the first prism into the waveguide and to emit radiation traveling in the opposite direction, said angle $\alpha$ being determined by the indices $n_p$, $n_v$ and $n_{eff}$ and by the prism angles $\gamma'$ and $\beta$, wherein the angle $$\alpha = \arcsin \left\{ \sin(\gamma' - \beta) \sqrt{n_v^2 - n_p^2 \sin^2 \left( \gamma' - \arcsin \frac{n_{eff}}{n_p} \right)} - n_p \cos (\gamma' - \beta) \sin \left( \gamma' - \arcsin \frac{n_{eff}}{n_p} \right) \right\},$$

said angles $\gamma'$ and $\beta$ and the indices $n_{eff}$, $n_p$ and $n_v$ in the temperature range $\Delta T$ being selected with the temperature responses for each of the indices $n_{eff}$, $n_p$ and $n_v$ and with the indices $n_p$ and $n_v$ compensating for the effect of temperature on the index of refraction $n_{eff}$ of the waveguide so that the coupling angle $\alpha$ remains essentially constant.

2. A prism coupling according to claim 1, wherein the waveguide is formed by doping a substrate of $LiNbO_3$, the first prism consisting of a material selected from a group consisting of $LiNbO_3$ and rutile and the second prism being a material selected from a group consisting of polystyrene, polymethylmethacrylate, and polycarbonate.

3. A prism coupling according to claim 2, wherein said first prism consists of $LiNbO_3$, the second prism consists of polystyrene, said second prism having an additional coupling surface extending in a plane parallel to the coupling surface of the first prism and in surface contact therewith, wherein the prism angle $\gamma'$ of the first prism and the prism angle $\beta$ of the second prism are calculated from the equation $$n_{vo} = \left\{ \left( \sqrt{n_{po} - n_{eff}} \; \frac{\sin \gamma'}{\sin (\gamma'' - \beta)} + \frac{\sin \alpha}{\tan (\gamma' - \beta)} - n_{effo} \frac{\cos \gamma}{\sin (\gamma' - \beta)} \right)^2 + \sin^2 \alpha \right\}^{\frac{1}{2}}$$

$$a_v = \frac{\sqrt{n_{po}^2 - n_{effo}^2} \cdot \sin \gamma' + \sin \alpha \cdot \cos (\gamma' - \beta) - n_{effo} \cdot \cos \gamma'}{n_{vo} \sin^2 (\gamma' - \beta)} \cdot \left( \frac{a_p n_{po} - a_s n_{effo}}{\sqrt{n_{po}^2 - n_{effo}^2}} \sin \gamma' - a_s \cos \gamma' \right)$$

and by the relationship $$\left| \sin (\gamma' - \beta) \cdot \sqrt{n_v^2 - \sin^2 \alpha} - \cos (\gamma' - \beta) \cdot \sin \alpha \right| \leq n_{vo}$$

wherein the coupling surface of the second prism forms the coupling surface of the composite prism.

4. A prism according to claim 2, wherein the waveguide is a planar waveguide produced by doping a substrate of LiNbO$_3$, said first prism is of LiNbO$_3$ and has a prism angle $\gamma' = 89.2°$, said second prism is a polystyrene and has a prism angle $\beta = 36.4°$.

5. In a prism coupler for coupling radiation into and out of an optical waveguide at a selected temperature range $\Delta T$, said coupler comprising a prism having a base surface extending at a prism angle $\gamma$ to the base surface, said prism being positioned on the waveguide with a coupling surface receiving radiation extending in a direction R at a coupling angle $\alpha$ to a normal of the coupling surface determined by the prism angle $\gamma$ and the index of refraction $n_p$ of the prism and of the waveguide, the improvements comprising the prism angle and the material of the prism being selected so that the effect of the temperature on the index of refraction of the prism and the effect of the temperature on an index of refraction of the waveguide in the temperature range $\Delta T$ is essentially linear to compensate one another and the coupling angle $\alpha$ becomes temperature independent and remains essentially constant, wherein the angle $$\alpha = \arcsin \left\{ n_p \cdot \sin \left( \gamma - \arcsin \frac{n_{eff}}{n_p} \right) \right\},$$

and wherein $n_p$ is greater than the effective index of refraction $n_{eff}$ of the light mode being guided in the waveguide.

* * * * *